United States Patent [19]

Loiotile et al.

[11] Patent Number: 4,814,367

[45] Date of Patent: Mar. 21, 1989

[54] STABILIZING HIGH DENSITY POLYETHYLENE CONTAINING CHROMIUM CATALYST RESIDUES WITH 2,2′-ETHYLIDENE-BIS(4,6-DI-T-BUTYL-PHENOL), A SOLID POLYOL HAVING FIVE TO SIX CARBON ATOMS, AND A TRIS(ALKYLARYL) PHOSPHITE

[75] Inventors: Vito S. Loiotile, Brooklyn, N.Y.; Michael H. Fisch, Wayne, N.J.; Paul E. Bennett, Conroe, Tex.

[73] Assignee: Argus Chemical Corporation, Brooklyn, N.Y.

[21] Appl. No.: 79,724

[22] Filed: Jul. 30, 1987

[51] Int. Cl.$^4$ ............................................... C08K 5/52
[52] U.S. Cl. .................... 524/151; 252/400.24; 524/343; 524/387; 524/388
[58] Field of Search ............... 526/106; 524/343, 387, 524/388, 151; 252/400.24

[56] References Cited

U.S. PATENT DOCUMENTS

| 3,489,826 | 1/1970 | Wescott | 524/583 |
| 4,170,589 | 10/1979 | Goeke et al. | 526/106 |
| 4,290,941 | 9/1981 | Zinke et al. | 524/343 |

FOREIGN PATENT DOCUMENTS

| 1253083 | 12/1960 | France | 524/388 |

OTHER PUBLICATIONS

A. Tkac, L. Omelka and J. Holcik: J. Polymer Sci. Symposium 40, 105–117 (1973).

Klender, Glass, Kolodchin & Schell: *ANTEC '85*, pp. 989–995.

Klender, Glass, Juneau, Kolodchin and Schell: Polyolefins V, Section C, Polyolefin Additives pp. 225–245, Jan. 1987.

*Primary Examiner*—Veronica P. Hoke

[57] ABSTRACT

High density polyethylene containing chromium catalyst residues is stabilized using a combination stabilizer system comprising 2,2′-ethylidene-bis(4,6-di-t-butylphenol), a solid polyol having from five to six carbon atoms and one alcoholic hydroxyl on each carbon, and a tris(alkylaryl)phosphite.

10 Claims, No Drawings

STABILIZING HIGH DENSITY POLYETHYLENE CONTAINING CHROMIUM CATALYST RESIDUES WITH 2,2'-ETHYLIDENE-BIS(4,6-DI-T-BUTYLPHENOL), A SOLID POLYOL HAVING FIVE TO SIX CARBON ATOMS, AND A TRIS(ALKYLARYL) PHOSPHITE

High density polyethylene is manufactured by the polymerization of ethylene in the presence of a metallic catalyst. A variety of catalyst systems are employed, of which transition metal coordination catalysts are probably the most widely used, based usually on titanium or chromium. Residual catalyst remains in the polymer. Although it has become possible in recent years to considerably reduce the amount of residual catalyst in the product, still enough remains to pose problems when stabilizers are added to the polymer, to improve resistance to deterioration during processing.

When a phenolic antioxidant is added to ethylene polymer containing metal catalyst residues, discoloration, sometimes severe, can result. Klender, Glass, Kolodchin and Schell, ANTEC '85, pages 989 to 995, note that several sources of such discoloration have been identified. Titanium residues can interact with partially-hindered phenolic antioxidants, with the formation of colored metal chelates. In addition, halides present in the catalyst residues can form halogen acids, which will catalyse dealkylation of phenolic antioxidants, and produce color. Moreover, the oxidation products of some phenolic antioxidants, such as butylated hydroxy toluene, are generally colored quinoid-type compounds, that impart color to the polymer by the very nature of their protective action during processing and thereafter.

Accordingly, additives have been sought that reduce such discoloration. Acid neutralizers and polyhydric alcohols have been shown to have a color-reducing effect in polyolefins prepared using Ziegler-Natta catalyst. Organic phosphites can act as color suppressants by their antioxidant action, in combination with a phenolic antioxidant, and so mimimize the oxidation of the phenolic antioxidant, and they can also act directly on the catalyst residues and/or the quinoid-type products of the phenolic antioxidant.

Klender, Glass, Kolodchin and Schell reported the effects of color suppressants, particularly polyhydric alcohols, on color development of phenolic antioxidants in olefin polymers containing titanium and chromium catalyst residues. Their work did not, however, result in an effective stabilizer system for high density polyethylene containing chromium catalyst residues.

Their work was done mostly with polypropylene, but two high density polyethylene polymers were studied, Polymer C, a homopolymer prepared with a chromium oxide catalyst and containing 1.6 ppm chromium, and Polymer D, a chromium oxide-based homopolymer containing 2.5 ppm chromium. Five phenolic antioxidants were tested with polypropylene, identified at pages 993 as follows:

A0-1  1,3,5-Trimethyl-2,4,6-tris(3,5-di-tert-butyl-4-hydroxybenzyl)benzene

A0-2  Tetrakis[methylene(3,5-di-tert-butyl-4-hydroxyhydrocinnamate)]methane

A0-3  Tris(3,5-di-tert-butyl-4-hydroxybenzyl)isocyanurate

A0-4  1,1,3-Tris(2-methyl-4-hydroxy-5-tert-butylphenyl)butane

A0-5  2,2'-Ethylidenebis(4,6-di-tert-butyl)phenol

At page 990, second column, the authors suggest that 2,6-di-tertiary-butyl substituted phenols are better than those with only one ortho-tertiary-butyl substituent in suppressing color.

At page 991, the authors discuss polyols as color suppressants for polypropylene. With polypropylene, eight different polyols were used, as shown in Table 1, page 994, including mannitol, in combination with 1,3,5-trimethyl-2,4,6-tris-(3,5-di-tertiary-butyl-4-hydroxybenzyl)benzene. Table 1 demonstrates that mannitol is the least effective of the polyols tested. At page 991, third column, paragraph 4, it is stated that mannitol accelerates the color development of polypropylene on multipass extrusion, which is consistent with the results reported in Table 1, suggesting that polyols with two to four hydroxyl groups are superior.

The effect of polyhydric alcohols on color in high density polyethylene is discussed beginning at the bottom of the first column on page 992. With polyethylene containing chromium oxide catalyst residues, glycerol and 1,3,5-trimethyl-2,4,6-tris(3,5-di-tertiary-butyl-4-hydroxybenzyl)benzene are used. FIG. 6 shows that glycerol is very effective in the reduction of both initial color and fifth pass color in both chromium-base and titanium-base catalytic residues.

The mechanisms of color development and color suppression are discussed in the second column of page 992, and the first column of page 993, and as might be expected, differ in the case of titanium and chromium catalyst residues. The authors suggest that the discoloration of high density polyethylene with chromium oxide catalyst residues when phenolic antioxidants are added may be due to formation of chromium phenolates, and that complexing of the chromium atom by polyhydric alcohols may be the mechanism of color suppression. The effect of phosphites in these systems is not discussed, but it is suggested that phosphites are important to color-hold in polymers containing titanium catalyst residues.

In a later paper presented at a technical meeting in Houston in January, 1987, *Polyolefins V, Section C, Polyolefin Additives*, Klender, Glass, Juneau, Kolodchin and Schell describe the effect of polyhydric alcohols and phosphite antioxidants in polypropylene, together with some work on the effect of polyhydric alcohols and acid neutralizers in high density polyethylene. Table 5 gives the effect of combinations of 1,3,5-trimethyl-2,4,6-tris(3,5-di-t-butyl-4-hydroxybenzyl)benzene with glycerol, and in some cases zinc stearate. The authors conclude on page 232 that the color reduction in such systems would not be adequate for commercial application. In addition to this, although not referred to by the authors, there is the problem that glycerol is a liquid, and consequently hard to handle.

In accordance with the present invention, a stabilizer system is provided for high density polyethylene comprising, in combination, 2,2'-ethylidene-bis(4,6-di-t-butylphenol), a solid polyhydric alcohol having from five to six carbon atoms and one alcoholic hydroxyl on each carbon atom, and a solid tris(alkylaryl)phosphite. While polyol and phenol are effective together, phenol and phosphite are rather poor, and it is quite surprising that phosphite gives a further boost to effectiveness when combined with phenol and polyol. As a result, this stabilizer system is very effective in lessening the discoloration that develops during processing at elevated temperatures of high density polyethylene containing chromium catalyst residues, while holding melt index at an acceptable level.

Since all of the ingredients are solids, the stabilizer system is readily formulated in particulate form, for use by polyethylene processors. In addition, these systems are compatible with metal soaps which are widely used in polyethylene for other purposes. Although such metal soaps seem to have no significant or noticeable effect in lessening discoloration during processing, and by themselves may increase discoloration, this effect is overcome by the addition to the metal soap of the stabilizer system of the invention.

The effectiveness of these stabilizer compositions appears to be limited to high density polyethylene containing chromium catalyst residues. Surprisingly, these stabilizer systems are not effective with polypropylene, and neither are they effective with polyethylenes made with a different type of catalyst system, such as a titanium system, for example, a Ziegler-Natta catalyst.

Moreover, the effect is limited to polyhydric alcohols as defined having five to six carbon atoms. Pentaerythritol, for example, is relatively ineffective. Glycerol is ruled out, because it is a liquid.

The specific phenolic antioxidant employed in the stabilizer systems of the invention, 2,2'-ethylidene-bis (4,6-di-t-butylphenol), is a solid, and is available commercially under the tradename Isonox 129.

The polyhydric alcohols having five to six carbon atoms and one alcoholic hydroxyl on each carbon atoms are solid at room temperature and include xylitol, adonitol, arabitol, mannitol, sorbitol, iditol and dulcitol.

The tris(alkylaryl) phosphites also are solid at room temperature, and have the formula:

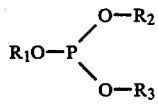

wherein $R_1$, $R_2$ and $R_3$ are alkylaryl groups having from seven to about thirty carbon atoms.

$R_1$, $R_2$ and $R_3$ alkylaryl groups in the phosphite include benzyl, phenethyl, phenylpropyl, phenylbutyl, phenylamyl, phenyloctyl, phenylnonyl; methylphenyl, ethylphenyl, propylphenyl, butylphenyl, amylphenyl, tert-butyl phenyl, tert-amyl phenyl, hexyl phenyl, octylphenyl, 2,6-di-t-butyl-4-methylphenyl, 2,6-di-t-butyl-4-(methoxycarbonylethyl phenyl, isooctylphenyl, t-octylphenyl, nonylphenyl, 2,4-di-t-butylphenyl, benzylphenyl and phenethylphenyl.

Tris(alkylaryl) phosphites include tris(2,4-di-t-butylphenyl) phosphite, tris-(2,6-di-t-butylphenyl)phosphite, tris-(2-t-butyl-4-methylphenyl) phosphite, bis-(2,4-di-t-butyl-6-methylphenyl) octylphenyl phosphite, bis-(2,6-di-t-butyl-4-methylphenyl) butylphenyl phosphite, bis(2,6-di-t-butyl-4-ethylphenyl) octylphenyl phosphite, bis(2,6-di-t-butyl-4-methylphenyl)2,4-di-t-butylphenyl phosphite, 2,6-di-t-butyl-4-methylphenyl-bis(2,4-di-t-octylphenyl) phosphite, tris(2,6-di-t-amyl-4-methylphenyl) phosphite and bis(2,6-di-t-amyl-4-methylphenyl) hexylphenyl phosphite.

The stabilizer systems of the invention are effective with any high density polyethylene prepared by polymerization of ethylene with a chromium-base catalyst system and containing chromium catalyst residues, including high density polyethylene homopolymer, as well as high density copolymers of ethylene with other copolymerizable olefin monomers, such as 1-butene, containing a major proportion of ethylene in the copolymer. Such polyethylenes can have their tendency to develop discoloration during processing lessened by addition of the stabilizer systems of the invention.

A sufficient amount of the stabilizer system is combined with the polymer to enhance the resistance of the polymer to deterioration of physical properties, including discoloration and change in melt index, under the heat and/or light conditions to which the polymer will be subjected, during processing and thereafter. Very small amounts are usually adequate. Amounts within the range from about 0.001 to about 0.5%, 2,2'-ethylidene-bis(4,6-di-t-butylphenol), from about 0.001 to about 0.5% polyol having five to six carbon atoms with one alcoholic hydroxyl on each carbon, and from about 0.002 to about 1% tris(alkylaryl) phosphite are satisfactory. Preferably, an amount within the range from about 0.01 to about 0.1 of each of the phenol, polyol and phosphite is employed, for optimum stabilizing effectiveness.

The stabilizer systems of the invention can be employed as the sole stabilizers. They can also be used in combination with other conventional additives and heat and light stabilizers for polyethylene, such as, for example, polyvalent metal salts of carboxylic acid, 2-hydroxybenzophenones, hydroxyaryl benzotriazoles, hindered amines, such as derivatives of 2,2,6,6-tetraalkyl piperidine-4-alcohols, as well as epoxy compounds.

The polyvalent metal salt of an organic acid has from about six to about twenty-four carbon atoms. The polyvalent metal can be any metal of Group II of the Periodic Table, such as zinc, calcium, cadmium, barium, magnesium, and strontium, zinc and calcium being preferred. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals, and other carboxylic ring structures condensed therewith. The oxygen-containing heterocyclic compounds include oxygen and carbon in the ring structure, such as alkyl-substituted furoic acid. The aromatic acids which can be employed can be carbocyclic or oxygen-containing heterocyclic in structure, and the aromatic acids likewise can have nonreactive ring substituents such as halogen alkyl and alkenyl groups and other saturated or aromatic rings condensed therewith.

As exemplary of the acids which can be used in the form of their metal salts there can be mentioned the following: hexoic acid, 2-ethyl-hexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy carpric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexanhydrobenzoic acid, and methyl furoic acid.

A particularly useful solid stabilizer system, capable of being reduced to particulate form to facilitate combination with the polymer, contains the following amounts of ingredients:

(a) 2,2'-ethylidene-bis(4,6-di-t-butylphenol) in an amount within the range from about 10 to about 45 parts by weight.

(b) polyol in an amount within the range from about 10 to about 55 parts by weight.

(c) phosphite in an amount within the range from about 25 to about 55 parts by weight.

(d) polyvalent metal salt of an aliphatic carboxylic acid or an alkyl phenol in an amount within the range from about 0 to about 45 parts by weight.

In addition, any of the conventional polyethylene resin additives, such as lubricants, emulsifiers, antistatic agents, flame-proofing agents, pigments and fillers, can be employed.

The stabilizer system of the invention since it is composed of solid ingredients can be formulated as a simple particulate mixture for incorporation in the polymer by the polymer manufacturer or by the converter. An inert organic solvent can be used if a homogeneous solution is desired.

The stabilizer combination is incorporated in the polymer in suitable mixing equipment, such as a mill or a Banbury mixer. Mixing is continued until the mixture is substantially uniform. The resulting composition is then removed from the mixing equipment and brought to the size and shape desired for marketing or use.

The stabilized polyethylene can be worked into the desired shape, such as by milling, calendering, extrusion or injection molding or fiber-forming. In such operations, it will be found to have a considerably improved resistance to change in melt viscosity during the heating, as well as a better resistance to discoloration and embrittlement on ageing and heating.

The following Examples in the opinion of the inventors represent preferred embodiments of stabilizer systems and stabilized polyethylene compositions in accordance with the invention.

In evaluating the effectiveness of the stabilizer systems, color measurements were made on 0.125 inch thick panels that were prepared by compression molding. Yellowness index (YI) data according to ASTM D 1925 were obtained using a Hunter laboratory model D25M colorimeter, and a white standard opaque background plate. The order of preference for the yellowness index YI is high negative, low negative, low positive, high positive.

Multipass extrusion was performed using a single screw extruder operated at the speed and temperature indicated for up to seven extrusions. The strand of polymer from the extruder was passed through a cold water bath and pelletized, and the pellets were reextruded, for each of the second through seventh extrusions. All extrusions were performed in air.

Melt flow index (MI) was determined using ASTM D1238-57 T at 190° C.

EXAMPLES 1 TO 4

Stabilizer systems in accordance with the invention were prepared, according to the following formulation:

| Example No. | 2,2'-ethylidene-bis(4,6-di-t-butylphenol) (phr) | Tris(2,4-di-t-butylphenyl) phosphite (phr) | Polyol (phr) |
|---|---|---|---|
| Control 1 | 0.03 | 0.07 | none |
| Control 2 | 0.07 | none | sorbitol 0.03 |
| Example 1 | 0.03 | 0.07 | sorbitol 0.05 |
| Example 2 | 0.03 | 0.07 | mannitol 0.05 |
| Example 3 | 0.03 | 0.07 | xylitol 0.05 |
| Control 3 | 0.03 | 0.07 | none zinc stearate 0.05 |
| Example 4 | 0.03 | 0.07 | sorbitol 0.02 zinc sterte 0.03 |

The phenolic antioxidant, phosphite and polyol stabilizer composition was blended with polyethylene powder (high density polyethylene containing chromium catalyst residues, from Chevron) and the resulting blend was fed through the extruder at 80 rpm, from which the composition was withdrawn as a continuous strand. The strand was passed through a water cooling bath, and chopped into pellets, which were collected and extruded again. This was repeated two more times. All extrusions were at 500° F. (260° C.) in all zones.

Samples were taken from the initial pellets and the two reextrusions, and separately molded into 0.125 inch thick panels. The melt flow index (MI) and color (YI) was determined for each sample.

The following results were obtained:

TABLE II

| Example No. | First Extrusion | | Second Extrusion | | Third Extrusion | |
|---|---|---|---|---|---|---|
| | Melt Index | Yellowness Index | Melt Index | Yellowness Index | Melt Index | Yellowness Index |
| Control 1 | 0.74 | −1.2 | 0.63 | 0.6 | 0.58 | 1.4 |
| Control 2 | 0.48 | −9.3 | 0.46 | −9.3 | 0.43 | −9.0 |
| Example 1 | 0.63 | −11.5 | 0.53 | −10.8 | 0.47 | −10.2 |
| Example 2 | 0.50 | −10.5 | 0.49 | −10.0 | 0.43 | −9.2 |
| Example 3 | 0.68 | −12.3 | 0.60 | −12.0 | 0.57 | −11.8 |
| Control 3 | 0.74 | 3.3 | 0.63 | 8.1 | 0.61 | 9.0 |
| Example 4 | 0.65 | −9.3 | 0.63 | −7.3 | 0.59 | −5.8 |

It is apparent from the above results that the stabilizer systems in accordance with the invention greatly improve resistance to discoloration as noted by yellowness index and lessen reduction in melt viscosity as noted by Melt Index. The dramatic effects of the phosphite and polyhydric alcohol on color are seen by comparing Controls 1 and 2 with Example 1. Phosphite and phenol together give very little inhibition of discoloration (Control 1) and melt index decreases significantly as well. Polyol and phenol together are quite effective in both respects, reducing discoloration and holding melt index rather well. In view of Control 1 results, it is accordingly rather surprising that addition of phosphite to Control 2 improves both resistance to discoloration and to reduction in melt index. Mannitol and xylitol give similar results (Examples 2 and 3).

In the absence of the polyol, the zinc stearate increases discoloration, as seen by comparing Control 3 with Control 1 and Example 4. Thus, the addition of sorbitol largely overcomes this adverse affect. It is apparent from the results that the stabilizer system of the invention does not require zinc stearate for its effectiveness, but is capable of overcoming the adverse effects of zinc stearate on color.

Surprisingly, when the stabilizer systems of Examples 1 to 4 are combined with polypropylene homopolymer, in comparison with Controls 1 and 2 under the same conditions, there is no significant difference in melt index or yellowness index between the controls and the Examples.

The same is true when polypentaerythritol is substituted for the polyols of Examples 1 to 4, either in polypropylene or in polyethylene.

EXAMPLES 5 TO 8

Stabilizer systems in accordance with the invention were prepared, according to the following formulations:

| Example No. | 2,2'-ethyidene-bis(4,6-di-t-butylphenol) (phr) | Tris(2,4-di-t-butylphenyl) phosphite (phr) | Polyol or ether (phr) |
|---|---|---|---|
| Control 1 | none | none | none |
| Control 2 | 0.02 | none | pentaerythritol 0.02 bis(2,4-di-t-butyl phenyl phosphite) |
| Control 3 | 0.02 | none | pentaerythritol 0.02 bis(2,4-di-t-butyl phenylphosphite) zinc stearate 0.03 |
| Control 4 | 0.02 | 0.02 | none |
| Control 6 | 0.04 | none | none |
| Control 7 | none | 0.04 | none |
| Control 8 | none | none | sorbitol 0.03 |
| Example 5 | 0.02 | 0.02 | sorbitol 0.03 |
| Example 6 | 0.013 | 0.027 | sorbitol 0.03 |
| Example 7 | 0.01 | 0.03 | sorbitol 0.03 |
| Example 8 | 0.008 | 0.032 | sorbitol 0.03 |
| Control 5 | 0.008 | 0.032 | none zinc stearate 0.03 |

The phenolic antioxidant, phosphite and polyol stabilizer composition was blended with polyethylene powder (high density polyethylene containing chromium catalyst residues, from Chevron) and the resulting blend was fed through the extruder at 90 rpm, from which the composition was withdrawn as a continuous strand. The strand was passed through a water cooling bath, and chopped into pellets, which were collected and extruded again. This was repeated six more times. The extruder temperatures were: Zone 1 380° F., Zone 2 400° F., Zone 3 420° F. and DIE 450° F.

Samples were taken from the initial pellets and the six reextrusions, and separately molded onto 0.125 inch (3.2 mm) thick panels. The melt flow index (MI) was determined for each sample.

The following results were obtained:

| Example No. | Extrusion 1 | | Extrusion 3 | | Extrusion 5 | | Extrusion 7 | |
|---|---|---|---|---|---|---|---|---|
| | MI | YI | MI | YI | MI | YI | MI | YI |
| Control 1 | 0.67 | −4.3 | 0.47 | −3.7 | 0.30 | −3.3 | 0.26 | −3.1 |
| Control 2 | 0.90 | −4.1 | 0.82 | −1.6 | 0.72 | −1.4 | 0.62 | −0.6 |
| Control 3 | 0.90 | −0.2 | 0.82 | +1.7 | 0.73 | +2.9 | 0.67 | +4.3 |
| Control 4 | 0.90 | +0.95 | 0.79 | +1.7 | 0.73 | +2.5 | 0.61 | +2.7 |
| Example 5 | 0.88 | −4.8 | 0.80 | −3.0 | 0.63 | −2.4 | 0.52 | −1.1 |
| Example 6 | 0.91 | −5.1 | 0.76 | −4.1 | 0.64 | −3.9 | 0.58 | −3.6 |
| Example 7 | 0.90 | −5.5 | 0.74 | −3.7 | 0.63 | −2.4 | 0.55 | −2.2 |
| Example 8 | 0.85 | −4.9 | 0.69 | −4.6 | 0.54 | −4.3 | 0.45 | −4.0 |
| Control 5 | 0.83 | −2.1 | 0.73 | −1.1 | 0.63 | −0.8 | 0.56 | +0.2 |
| Control 6 | 0.88 | +6.2 | 0.77 | +9.2 | 0.48 | +11.2 | 0.41 | +12.3 |
| Control 7 | 0.77 | −3.4 | 0.57 | −2.9 | 0.49 | −2.6 | 0.44 | −1.6 |
| Control 8 | 0.75 | −4.2 | 0.51 | −3.6 | 0.48 | −2.9 | 0.37 | −1.8 |

It is evident from these results that compositions of Examples 5 to 8 are outstanding in color protection while maintaining acceptable melt index. None of the Controls are able to do so.

Having regard to the foregoing disclosure the following is claimed as the inventive and patentable embodiments thereof:

1. A stabilizer composition for lessening discoloration of high density polyethylene containing chromium catalyst residues when processed at elevated temperatures, comprising, in combination:
   (a) from about 10 to about 45 parts by weight 2,2'-ethylidene-bis(4,6-di-t-butyl phenol)
   (b) from about 10 to about 55 parts by weight polyol having from five to six carbon atoms and one hydroxyl group per carbon atom
   (c) from about 25 to about 55 parts by weight tris(alkylaryl) phosphite having the formula:

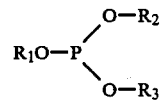

wherein:
   $R_1$, $R_2$ and $R_3$ are alkylaryl groups having from seven to about thirty carbon atoms.

2. A stabilizer composition according to claim 1 in which the phosphite is tris(2,4-di-tert-butyl phenyl) phosphite.

3. A stabilizer composition according to claim 1 in which the polyol is sorbitol.

4. A stabilizer composition according to claim 1 in which the polyol is mannitol.

5. A stabilizer composition according to claim 1 in which the polyol is xylitol.

6. High density polyethylene containing chromium catalyst residues and having a low tendency to discolor when processed at elevated temperatures comprising high density polyethylene and a stabilizer composition according to claim 1.

7. High density polyethylene containing chromium catalyst residues and having a low tendency to discolor when processed at elevated temperatures comprising high density polyethylene and a stabilizer composition according to claim 2.

8. High density polyethylene containing chromium catalyst residues and having a low tendency to discolor when processed at elevated temperatures comprising high density polyethylene and a stabilizer composition according to claim 3.

9. High density polyethylene containing chromium catalyst residues and having a low tendency to discolor when processed at elevated temperatures comprising high density polyethylene and a stabilizer composition according to claim 4.

10. High density polyethylene containing chromium catalyst residues and having a low tendency to discolor when processed at elevated temperatures comprising high density polyethylene and a stabilizer composition according to claim 5.

* * * * *